United States Patent
Kim et al.

(10) Patent No.: US 9,444,344 B2
(45) Date of Patent: Sep. 13, 2016

(54) METHODS AND APPARATUSES FOR OBTAINING VOLTAGE INFORMATION BASED ON CHARGE PACKETS INPUT AT DIFFERENT TIMINGS

(71) Applicant: Samsung Electronics Co., Ltd., Suwon-Si, Gyeonggi-Do (KR)

(72) Inventors: Jin-Myoung Kim, Hwaseong-si (KR); Kang-Ho Lee, Hwaseong-si (KR); Jae-chul Park, Yangju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 199 days.

(21) Appl. No.: 14/456,487

(22) Filed: Aug. 11, 2014

(65) Prior Publication Data

US 2015/0123712 A1    May 7, 2015

(30) Foreign Application Priority Data

Nov. 7, 2013  (KR) .......................... 10-2013-0134990

(51) Int. Cl.
*H02J 1/10* (2006.01)
*G01T 1/24* (2006.01)
*H02M 3/158* (2006.01)

(52) U.S. Cl.
CPC ............ *H02M 3/1584* (2013.01); *G01T 1/247* (2013.01); *H02J 1/10* (2013.01); *H02M 2003/1586* (2013.01)

(58) Field of Classification Search
CPC . G01T 1/247; H02J 1/10; H02M 2003/1583; H02M 3/1584
See application file for complete search history.

(56) References Cited

U.S. PATENT DOCUMENTS

| | | | | |
|---|---|---|---|---|
| 7,462,834 | B2 * | 12/2008 | Masazumi | G01T 1/24 250/370.09 |
| 8,384,038 | B2 | 2/2013 | Guo et al. | |
| 2007/0023668 | A1 * | 2/2007 | Dhurjaty | G01T 1/17 250/370.09 |
| 2009/0184253 | A1 * | 7/2009 | Adachi | A61B 6/4233 250/370.09 |
| 2013/0075608 | A1 | 3/2013 | Han et al. | |
| 2013/0248720 | A1 * | 9/2013 | Kim | G01J 1/44 250/362 |

FOREIGN PATENT DOCUMENTS

| | | |
|---|---|---|
| JP | 3008621 B2 | 2/2000 |
| KR | 100780315 B1 | 11/2007 |
| KR | 100867891-13 | 11/2008 |
| KR | 101010916 B1 | 1/2011 |

* cited by examiner

*Primary Examiner* — Casey Bryant

(57) ABSTRACT

Disclosed is a voltage obtaining apparatus. The voltage obtaining apparatus includes a plurality of conversion units, which are connected to each other in parallel and respectively convert charge packets into voltages, and a control unit that controls a timing when the charge packets are respectively input to the plurality of conversion units. The control unit is configured to control the timing so that a corresponding charge packet is input to an nth conversion unit (where n denotes number of the conversion units) at a timing when an operation of an (n−1)th conversion unit is ended.

20 Claims, 10 Drawing Sheets

METHODS AND APPARATUSES FOR OBTAINING VOLTAGE INFORMATION BASED ON CHARGE PACKETS INPUT AT DIFFERENT TIMINGS

RELATED APPLICATIONS

This application claims priority from Korean Patent Application No. 10-2013-0134990, filed on Nov. 7, 2013, in the Korean Intellectual Property Office, the disclosure of which is incorporated herein in its entirety by reference.

BACKGROUND

1. Field

Example embodiments relate to methods and apparatuses for obtaining voltage information based on charge packets input at different timings.

2. Description of the Related Art

X-ray image photographing systems, which are medical imaging equipment using radiation, are undergoing a transition from analog to digital. With such a trend, X-ray detectors, which are essential elements of digital X-ray systems are also undergoing a change. Digital X-ray detection technology is typically categorized into an indirect method, which converts X-ray into visible light and then converts the visible light signal into an electrical signal to generate an image, and a direct method, which converts an X-ray signal into an electrical signal to generate an image.

The indirect method is typically categorized into an integrating method, which accumulates a converted electrical signal for a certain time to generate an image signal, and a photon counting detection (PCD) method, which counts the number of X-ray photons to generate an image signal. Here, the PCD method generates an image, which enables an X-ray energy level to be distinguished, through only one-time photographing, and obtains a high-quality image of an object although the object is slightly exposed to X-rays.

SUMMARY

Example embodiments relate to methods and apparatuses for obtaining voltage information based on charge packets input at different timings.

Provided is a non-transitory computer-readable storage medium storing a program for executing the method in a computer.

Additional example embodiments will be set forth in part in the description which follows and, in part, will be apparent from the description, or may be learned by practice of the example embodiments.

According to at least one example embodiment, a voltage obtaining apparatus includes a plurality of conversion units that are connected to each other in parallel, and respectively convert charge packets into voltages, and a control unit that controls a timing when the charge packets are respectively input to the plurality of conversion units, wherein the control unit controls the timing so that a corresponding charge packet is input to an nth conversion unit at a timing when an operation of an n−1st conversion unit is ended, wherein n denotes number of the conversion units.

According to at least one example embodiment, a voltage obtaining method includes transferring a charge packet to an n−1st conversion unit (where n denotes number of conversion units), and transferring a charge packet, which differs from the charge packet transferred to the n−1st conversion unit, to an nth conversion unit at a timing when an operation of the n−1st conversion unit is ended, wherein a plurality of the conversion units are connected to each other in parallel, and each converts a transferred charge packet into a voltage.

According to at least one example embodiment, provided is a non-transitory computer-readable storage medium storing a program for executing the method in a computer.

BRIEF DESCRIPTION OF THE DRAWINGS

These and/or other example embodiments will become apparent and more readily appreciated from the following description of the example embodiments, taken in conjunction with the accompanying drawings in which.

DETAILED DESCRIPTION

Figure 1:
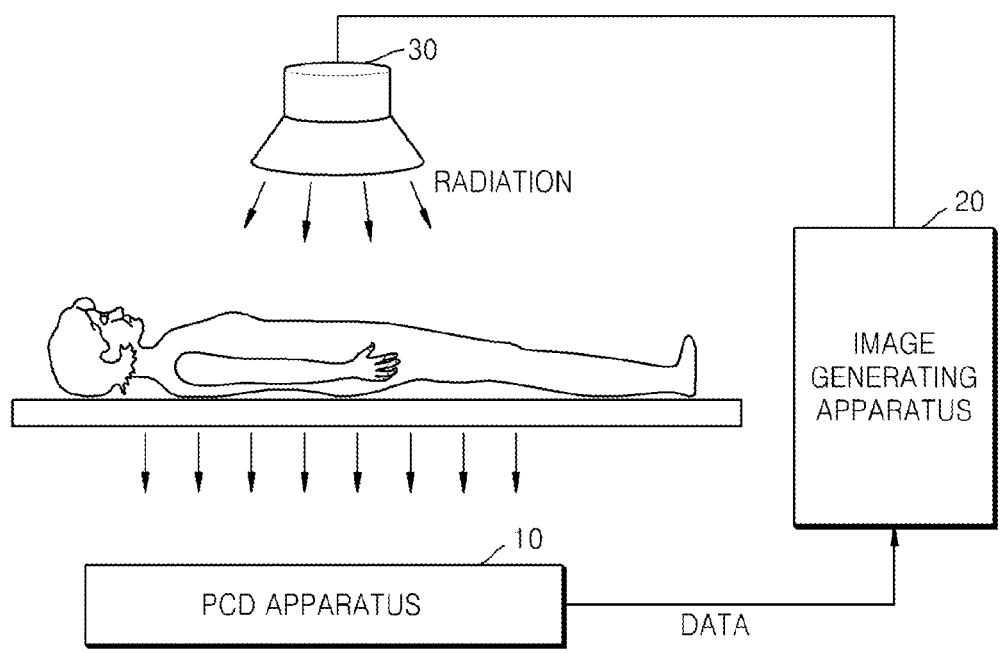
FIG. 1 is a diagram illustrating an example of a medical imaging system according to an example embodiment.

Reference will now be made in detail to example embodiments illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures. Expressions such as "at least one of," when preceding a list of elements, modify the entire list of elements and do not modify the individual elements of the list.

The following example embodiments are not to restrict or limit the scope thereof. It will be understood that when an element is referred to as being "on," "connected" or "coupled" to another element, it can be directly on, connected or coupled to the other element or intervening elements may be present. In contrast, when an element is referred to as being "directly on," "directly connected" or "directly coupled" to another element, there are no intervening elements present. As used herein the term "and/or" includes any and all combinations of one or more of the associated listed items. Further, it will be understood that when a layer is referred to as being "under" another layer, it can be directly under or one or more intervening layers may also be present. In addition, it will also be understood that when a layer is referred to as being "between" two layers, it can be the only layer between the two layers, or one or more intervening layers may also be present.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

In the drawing figures, the dimensions of layers and regions may be exaggerated for clarity of illustration. Like reference numerals refer to like elements throughout. The same reference numbers indicate the same components throughout the specification.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein. As used herein, expressions such as "at least one of," when preceding a list of elements, modify the entire list of elements and do not modify the individual elements of the list.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain example embodiments of the present description.

FIG. 1 is a diagram illustrating an example of a medical imaging system according to an example embodiment.

Referring to FIG. 1, the example medical imaging system includes a PCD apparatus 10, an image generating apparatus 20, and a radiation generating apparatus 30. The medical imaging system using radiation detects, by using a sensor, multi-energy radiation that passes through an object such as a human body. The medical imaging system classifies and counts, by energy level, photons included in the multi-energy radiation detected by the sensor, and generates images by energy level of a human body region on the basis of the counted result.

The medical imaging system classifies and counts, by energy level, photons included in multi-energy radiation that passes through an object such as a human body, and generates medical images by using the counted number of photons by energy level. An amount of radiation absorbed by the object is changed depending on a kind or density of the object with the multi-energy radiation irradiated thereon or an energy level of the radiation.

For example, bones absorb a large amount of X-rays, but muscles absorb a smaller amount of X-rays. Therefore, the number of detected photons when the photons included in radiation generated by the radiation generating apparatus 30 pass through a bone differs from the number of detected photons when the radiation passes through a human tissue other than the bone. Also, depending on energy levels of the photons included in the radiation generated by the radiation generating apparatus 30, the counted numbers by energy level of detected photons when the radiation passes through a bone differs from the counted numbers by energy level of detected photons when the radiation passes through a human tissue other than the bone.

The image generating apparatus 20 may generate an X-ray image that enables various human tissues to be clearly distinguished, by using a result that is obtained by classifying and counting photons by energy level in the PCD apparatus 10.

The radiation generating apparatus 30 generates radiation, and irradiates the radiation on an object. The radiation generated by the radiation generating apparatus 30 may be in various forms such as ultrasonic waves, alpha rays, beta rays, gamma rays, X-rays, and neutron rays. However, general radiation may denote X-rays that cause ionization to damage a human body. Hereinafter, example embodiments will be described with X-rays as an example, but technical principles to be described below may also be applied to other radiation in addition to X-rays, such as the examples of radiation described above, among other types of radiation.

According to at least one example embodiment, a pixel region of the PCD apparatus 10 corresponds to a photographing region of an object to be photographed by using radiation, and the PCD apparatus 10 includes a readout circuit 100 that corresponds to each of a plurality of pixels included in the pixel region. The PCD apparatus 10 outputs a counting result, which is obtained from each of a plurality of the readout circuits 100, to the image generating apparatus 20. The image generating apparatus 20 generates an image of the object by using the counting result.

Specifically, the readout circuit 100 included in the PCD apparatus 10 classifies, by energy level, an electrical signal input from a unit sensor in communication with the readout circuit 100, and converts the electrical signal into a digital signal to output the digital signal to the image generating apparatus 20. The unit sensor corresponds to a certain region of a sensor, and outputs an electrical signal, generated from a detected photon, to the readout circuit 100 of a corresponding readout chip through a unit output terminal. Examples of a method, in which the readout circuit 100 reads out an electrical signal input from the unit sensor, include a charge integration mode and a photon counting mode.

Hereinafter, a readout circuit may include a voltage obtaining unit, a determination unit, and a reset unit which will be described below with reference to FIGS. 2 to 9. The readout circuit will be described on the assumption that the readout circuit operates in the photon counting mode. Also, a PCD apparatus may include a plurality of readout circuits.

Figure 2:
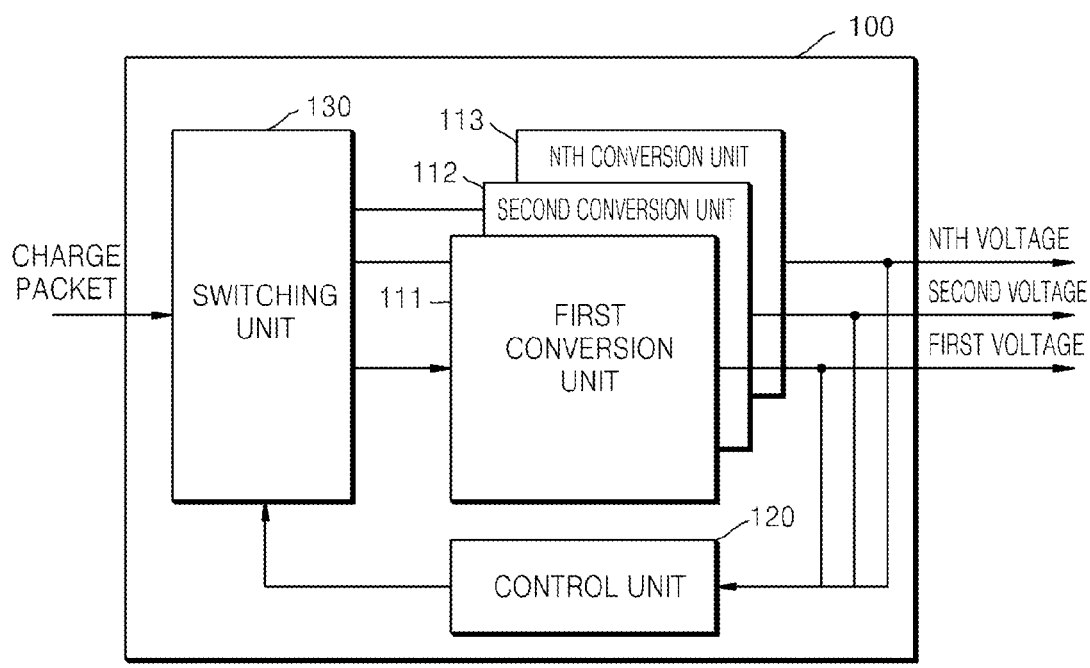
FIG. 2 is a block diagram illustrating an example of a voltage obtaining unit according to an example embodiment.

FIG. 2 is a block diagram illustrating an example of a voltage obtaining unit 100 according to an example embodiment.

Referring to FIG. 2, the voltage obtaining unit 100 includes a plurality of conversion units (for example, a first conversion unit 111, a second conversion unit 112, and an nth conversion unit 113), a control unit 120, and a switching unit 130. The voltage obtaining circuit 100 of FIG. 2 is illustrated as including only the elements associated with the example embodiment for clarity of the description. Therefore, it can be understood by one of ordinary skill in the art that the voltage obtaining circuit 100 may further include general-use elements in addition to the elements of FIG. 2.

Moreover, it can be understood by one of ordinary skill in the art that each of the conversion units 111 to 113, control unit 120, and switching unit 130 of FIG. 2 may be provided as an independent apparatus.

Moreover, the conversion units 111 to 113, control unit 120, and switching unit 130 of FIG. 2 may correspond to one or more processors. Each of the processors may be implemented as an array of a plurality of logic gates, or may be implemented as a combination of a general-use microprocessor and a memory that stores a program executable by the microprocessor. Also, it can be understood by one of ordinary skill in the art that the voltage obtaining circuit 100 may be implemented as another type of hardware.

According to at least one example embodiment, each of the conversion units 111 to 113 converts a charge packet into a voltage. In other words, the first conversion unit 111 converts the charge packet, input to the first conversion unit 111, into the voltage. Also, the second and nth conversion units 112 and 113 operate identically to the first conversion unit 111.

Here, the charge packet denotes an electrical charge packet that is generated from an X-ray generated photon packet input to the PCD apparatus 10. For example, a photoconducting material may generate the charge packet by using the X-ray generated photon input to the PCD apparatus 10. Although not shown, the photoconducting material may include the voltage obtaining unit 100, and may be provided as an independent apparatus.

The conversion units 111 to 113 may be connected to each other in parallel. Therefore, the charge packet input to the voltage obtaining unit 100 may be input to one of the conversion units 111 to 113 through the switching unit 130. A total of three conversion units 111 to 113 are illustrated in FIG. 2, but the example embodiment is not limited thereto. In other words, the number of conversion units are not limited to three, and may be changed depending on an area of the readout circuit.

As described above, the voltage obtaining unit 100 according to an example embodiment converts the charge packet into the voltage by using the plurality of conversion units 111 to 113 connected in parallel, and thus may respectively convert continuously-input charge packets into voltages without any overlap therebetween. Therefore, the voltage obtaining unit 100 obtains a voltage by using charge packets.

According to at least one example embodiment, the switching unit 130 includes a plurality of switches respectively connected to the conversion units 111 to 113. The switching unit 130 turns on one of the switches according to a control signal transferred from the control unit 120, and transfers a charge packet to a corresponding conversion unit connected to the turned-on switch.

The control unit 120 may further control a timing when a charge packet is input to each of the conversion units 111 to 113. Here, the timing when the charge packet is input denotes a timing when an operation of a conversion unit, to which the charge packet is previously input, is ended. That is, the control unit 120 controls a timing when the switching unit 130 operates, in order for the charge packet to be input to the nth conversion unit 113 at a timing when an operation of an (n−1)th conversion unit is ended.

A timing when the operation of the (n−1)th conversion unit is ended may be variously set, and for example, may include a timing when a voltage obtained through conversion by the (n−1)th conversion unit has the maximum value, a timing when the voltage obtained through conversion by the (n−1)th conversion unit exceeds a desired, or alternatively predetermined threshold value, a timing when the voltage obtained through conversion by the (n−1)th conversion unit exceeds the maximum value and then a certain time elapses, and a timing when the voltage obtained through conversion by the (n−1)th conversion unit exceeds the maximum value and then decreases by a certain value.

For example, the control unit 120 may turn on the switching unit 130 connected to the conversion units 111 to 113 at a certain timing to control a timing when a charge packet is input to each of the conversion units 111 to 113. Hereinafter, a detailed example method in which the control unit 120 operates will be described with reference to FIG. 3.

Figure 3:
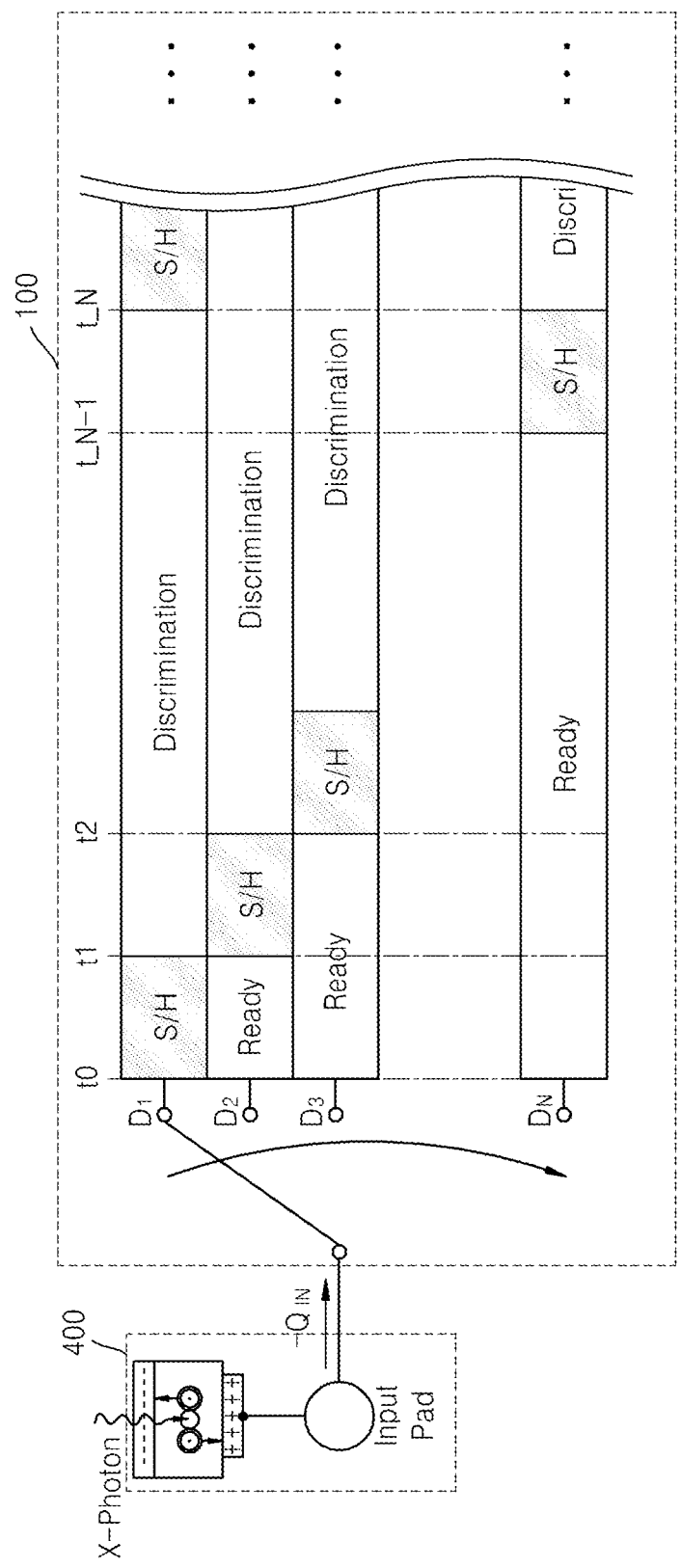
FIG. 3 is a diagram for describing an example in which a control unit according to an example embodiment operates.

FIG. 3 is a diagram for describing an example in which a control unit according to an example embodiment operates.

Referring to FIG. 3, timings when the first to nth conversion units included in the voltage obtaining unit 100 operate are illustrated. Also, a photoconducting material unit 400 connected to the voltage obtaining unit 100 is illustrated in FIG. 3.

The photoconducting material unit 400 generates a charge packet QIN by using an X-photon input to the PDC apparatus 10. Generally, photons are continuously input to the PCD apparatus 10, and thus, a plurality of charge packets QIN are continuously output from the photoconducting material unit 400.

The control unit 120 according to an example embodiment controls a timing when the charge packet QIN is input to each of the plurality of conversion units. That is, the control unit 120 controls an operation of the switching unit 130 so that the charge packets QIN continuously output from the photoconducting material unit 400 are respectively input to different conversion units.

According to at least one example embodiment, the control unit 120 turns on a switch $D_1$ which connects the photoconducting material unit 400 to the first conversion unit, and turns off switches $D_2$ to $D_N$, which respectively connect the photoconducting material unit 400 to the second to nth conversion units, at a timing to. Therefore, the charge packet QIN output from the photoconducting material unit 400 is input to the first conversion unit, which converts the charge packet QIN into a voltage. Here, a detailed method in which the first conversion unit converts the charge packet QIN into the voltage will be described below in detail with reference to FIG. 4.

According to at least one example embodiment, the control unit 120 turns on the switch $D_2$ which connects the photoconducting material unit 400 to the second conversion unit, and turns off the switch $D_1$ which connects the photoconducting material unit 400 to the first conversion unit, at a timing t1, when an operation of the first conversion unit is ended. Therefore, the charge packet QIN output from the photoconducting material unit 400 is input to the second conversion unit, which converts the charge packet QIN into a voltage. Here, the charge packet QIN input to the second conversion unit differs from the charge packet QIN input to the first conversion unit, and denotes one of charge packets which are continuously output from the photoconducting material unit 400.

Here, the timing $t_1$ when the operation of the first conversion unit is ended denotes a timing when a voltage obtained through conversion by the first conversion unit has an optimal, or a maximum value. That is, the control unit 120 turns on the switch $D_2$ which connects the photoconducting material unit 400 to the second conversion unit, at the timing when the voltage obtained through conversion by the first conversion unit has reached the optimal or maximum value.

Accordingly, the control unit 120 turns on the switch $D_N$ which connects the photoconducting material unit 400 to the nth conversion unit, and turns off the switch $D_{N-1}$ which connects the photoconducting material unit 400 to the (n−1)th conversion unit, at a timing $t_{N-1}$ when an operation of the (n−1)th conversion unit is ended. Also, the control unit 120 again turns on the switch $D_1$ which connects the photoconducting material unit 400 to the first conversion unit, and again turns off the switch $D_N$ which connects the photoconducting material unit 400 to the nth conversion unit, at a timing $t_N$ when an operation of the nth conversion unit is ended.

In order to prevent any overlap, or any substantial overlap between signals processed by the PCD apparatus 10, the control unit 120 operates so as to satisfy the following Equation (1):

$$N \times T_{con} > T_{dis} \quad (1)$$

where N denotes the number of conversion units, and $T_{con}$ denotes a conversion period (i.e., a time taken converting a charge packet into a voltage) in which one conversion unit operates. Also, $T_{dis}$ denotes a time taken in determining an energy level of a converted voltage, and denotes a time when a determination unit to be described below with reference to FIG. 5 operates.

Figure 4A:
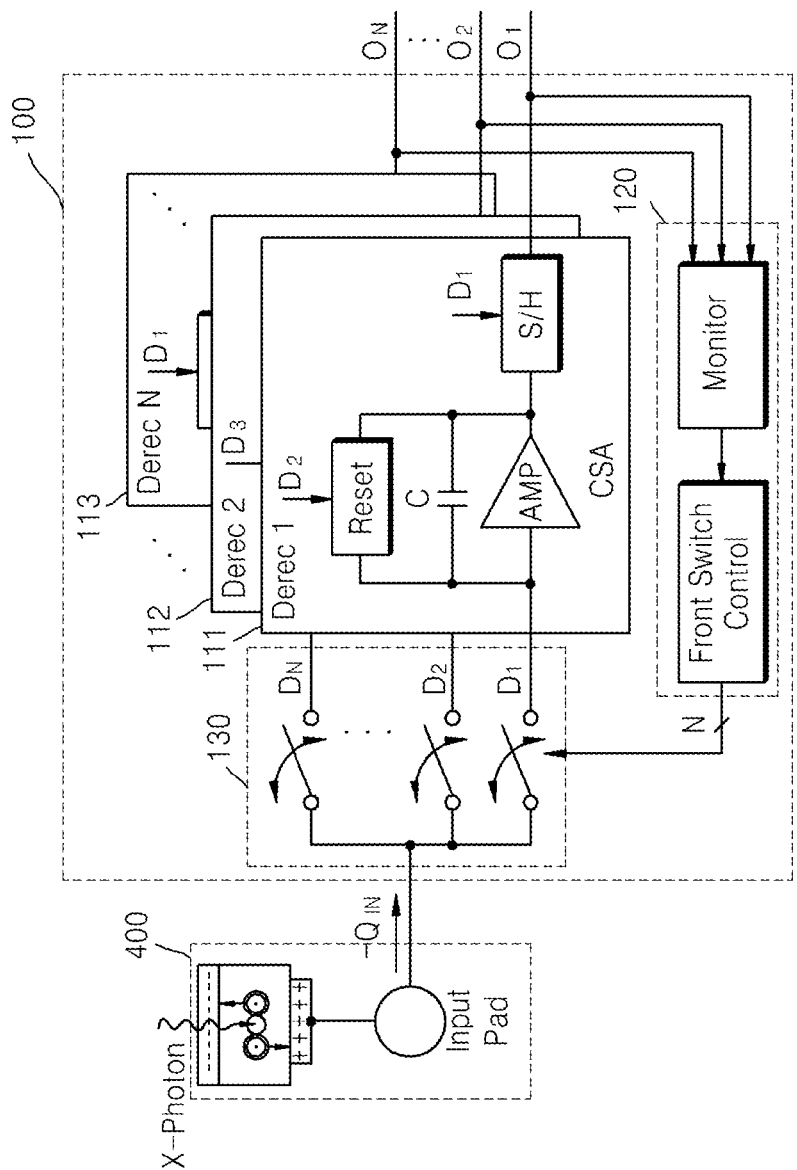
FIGS. 4A-4B are circuit diagrams respectively illustrating examples of the voltage obtaining unit according to an example embodiment.
Figure 4B:
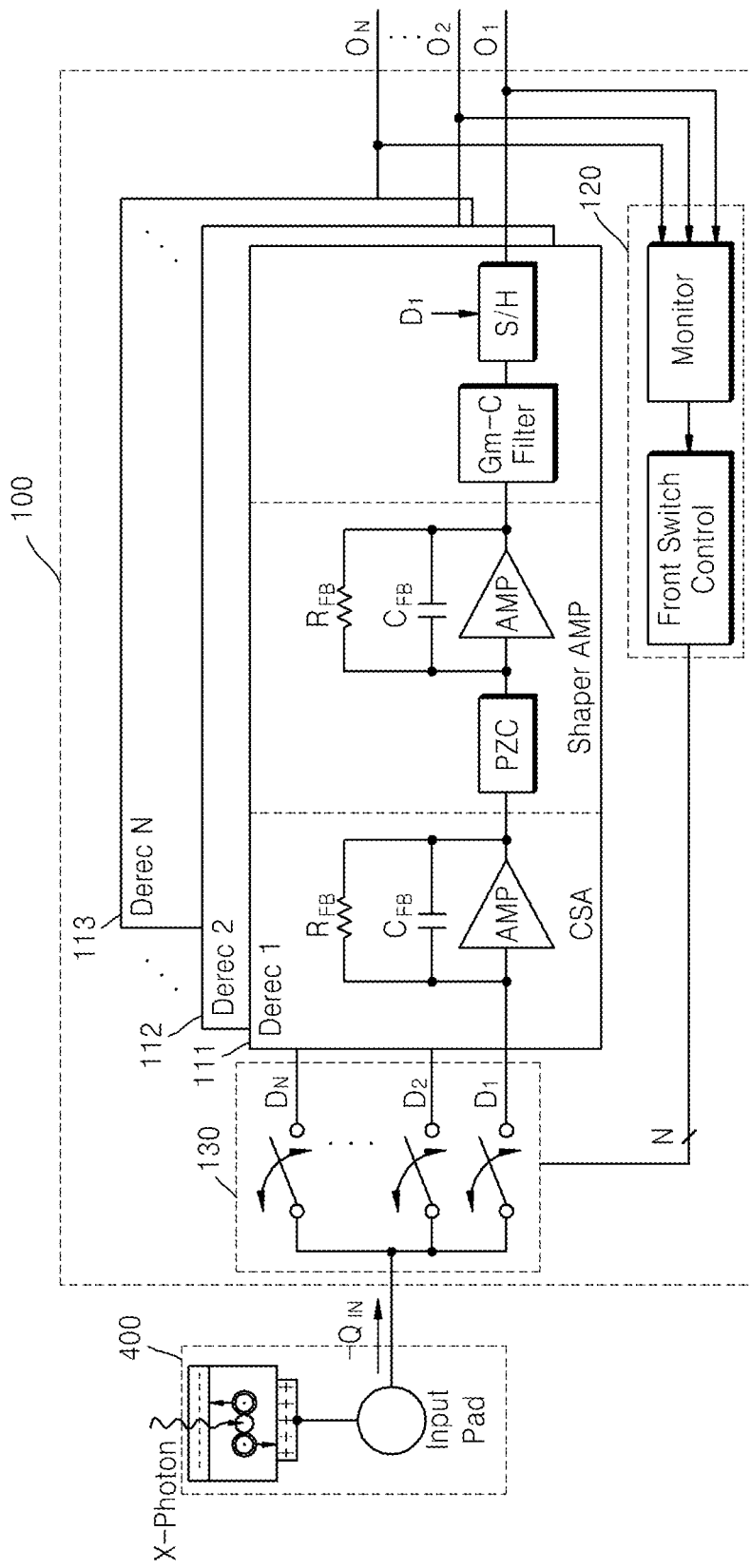

FIGS. 4A-4B are circuit diagrams respectively illustrating examples of the voltage obtaining unit 100 according to various example embodiments.

Referring to FIGS. 4A and 4B, circuit diagrams of the voltage obtaining unit 100 are respectively illustrated. Also, the photoconducting material unit 400 that generates a charge packet by using a photon is illustrated. In FIGS. 4A and 4B, there is only a difference between the conversion units 111 to 113, and a configuration of each of the switching unit 130 and the control unit 120 is the same. Also, the first to nth conversion units 111 to 113 of FIG. 4A have the same configuration, and the first to nth conversion units 111 to 113 of FIG. 4B have the same configuration.

Referring to FIG. 4A, each of the conversion units 111 to 113 may forcibly reset a voltage by using a metal oxide semiconductor (MOS) switch (Reset). Hereinafter, an example in which the circuit of FIG. 4A operates will be described.

When the charge packet QIN is output from the photoconducting material unit 400, the control unit 120 only turns on switch $D_1$, which connects the photoconducting material unit 400 to the first conversion unit 111, among the switches $D_1$ to $D_N$ included in the switching unit 130. The charge packet QIN input to the first conversion unit 111 is charged as a voltage into a capacitor $C_{FB}$ connected to a charge sensitive amplifier (CSA).

At this time, a monitor included in the control unit 120 detects a period in which the voltage charged into the capacitor $C_{FB}$ increases, and when the voltage has reached the optimal or maximum value, the optimal or maximum value is stored in a sampler/holder S/H. In addition, a front switch controller included in the control unit 120 turns off the switch $D_1$ which connects the photoconducting material unit 400 to the first conversion unit 111, and turns on the switch $D_2$ that connects the photoconducting material unit 400 to the second conversion unit 112, at a timing when the voltage has the optimal or maximum value. Therefore, the charge packet QIN input to the voltage obtaining unit 100 is subsequently transferred to the second conversion unit 112.

Moreover, the voltage charged into the capacitor $C_{FB}$ of the first conversion unit 111 is reset (i.e., discharged) through the MOS switch (Reset) at a timing when the switch $D_1$, which connects the photoconducting material unit 400 to the first conversion unit 111, is turned off. At this time, an operation of the MOS switch may be controlled by a reset unit 300 to be described below with reference to FIG. 5.

In an X-ray detection circuit using the PCD mode, the voltage charged into the capacitor $C_{FB}$ of the conversion unit may be reset after a certain time elapses. In other words, a voltage (i.e., the voltage charged into the capacitor $C_{FB}$) expressing information about one charge packet may return to the original voltage level after a certain time elapses. This is because when charge packets generated from continuously-input photons are accumulated into the capacitor $C_{FB}$, a quality of an image generated by the image generating apparatus 20 is reduced.

Accordingly, the second to nth conversion units 112 to 113 operate sequentially. Also, when an operation of the nth conversion unit 113 is ended, the conversion units 111 to 113 operate in a way that the first conversion unit 111 then operates.

Referring to FIG. 4B, each of the conversion units 111 to 113 may forcibly reset a voltage by using a feedback resistor $R_{FB}$. Hereinafter, an example in which the circuit of FIG. 4B operates will be described.

When the charge packet QIN is output from the photoconducting material unit 400, the control unit 120 only turns on the switch $D_1$, which connects the photoconducting material unit 400 to the first conversion unit 111, among the switches $D_1$ to $D_N$ included in the switching unit 130. The charge packet QIN input to the first conversion unit 111 is charged as a voltage into the capacitor $C_{FB}$ connected to the charge sensitive amplifier (CSA).

At this time, the monitor included in the control unit 120 detects a period in which the voltage charged into the capacitor $C_{FB}$ increases, and when the voltage has the optimal or maximum value, the maximum value is stored in the sampler/holder. In addition, the front switch controller included in the control unit 120 turns off the switch $D_1$ which connects the photoconducting material unit 400 to the first conversion unit 111, and turns on the switch $D_2$ which connects the photoconducting material unit 400 to the second conversion unit 112, at a timing when the voltage has the optimal or maximum value. Therefore, the charge packet QIN input to the voltage obtaining unit 100 is subsequently transferred to the second conversion unit 112.

Moreover, the voltage charged into the capacitor $C_{FB}$ of the first conversion unit 111 is reset (i.e., discharged) through the feedback resistor $R_{FB}$ at a timing when the switch $D_1$, which connects the photoconducting material unit 400 to the first conversion unit 111, is turned off.

Accordingly, the second to nth conversion units 112 to 113 may operate sequentially. Also, when an operation of the nth conversion unit 113 is ended, the conversion units 111 to 113 operate in a way that the first conversion unit 111 operates.

As described above, based on the control signal of the control unit 120, the conversion units 111 to 113 may operate without any overlap, or any substantial overlap therebetween, and respectively convert sequentially-input charge packets QIN into voltages. Therefore, the PCD apparatus 10 may quickly detect the number of X-photons.

Figure 5:
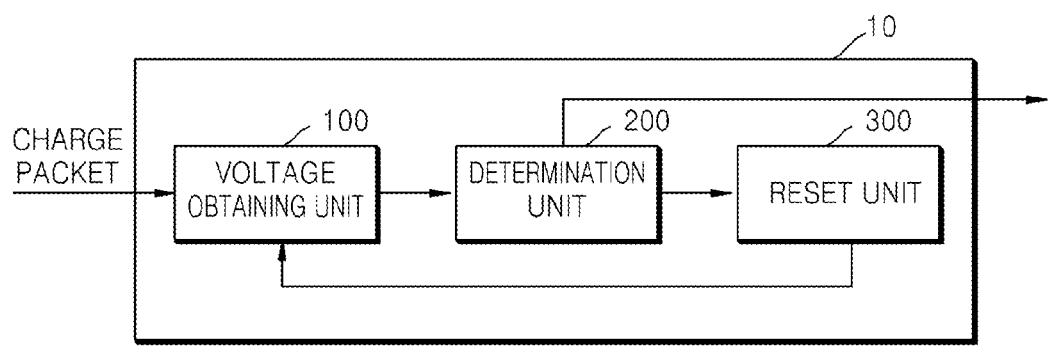
FIG. 5 is a block diagrams illustrating an example of a PCD apparatus according to an example embodiment.

FIG. 5 is a block diagrams illustrating an example of the PCD apparatus 10 according to an example embodiment.

Referring to FIG. 5, the example PCD apparatus 10 includes the voltage obtaining unit 100, a determination unit 200, and the reset unit 300. The PCD apparatus 10 of FIG. 5 is illustrated as including only the elements associated with the example embodiment. Therefore, it can be understood by one of ordinary skill in the art that the PCD apparatus 10 may further include general-use elements in addition to the elements of FIG. 5.

Moreover, it can be understood by one of ordinary skill in the art that each of the voltage obtaining unit 100, determination unit 200, and reset unit 300 of FIG. 5 may be provided as an independent element.

Moreover, the voltage obtaining unit 100, determination unit 200, and reset unit 300 of FIG. 5 may correspond to one or more processors. Each of the processors may be implemented as an array of a plurality of logic gates, or may be implemented as a combination of a general-use microprocessor and a memory that stores a program executable by the microprocessor. Also, it can be understood by one of ordinary skill in the art that the PCD apparatus 10 may be implemented as another type of hardware.

The example voltage obtaining unit 100 of FIG. 5 operates as described above with reference to FIGS. 1 to 4. Therefore, a detailed description of the voltage obtaining unit 100 is not repeated.

According to at least one example embodiment, the determination unit 200 detects a change in a voltage value of a changed voltage by using 'm' number of different voltage values. In other words, the determination unit 200 divides a voltage range, which is allowable to a voltage transferred from the voltage obtaining unit 100, into the 'm' different voltage values. The determination unit 200 detects voltage values from a voltage which is changed with time, by using the divided 'm' voltage values. The determination unit 200 increases counting by using information included in the changes in the detected voltage values. Here, the information included in the changes in the detected voltage values denotes information about whether the voltage reaches the 'm' different voltage values. Hereinafter, an operation of the example determination unit 200 will be described in detail with reference to FIG. 6.

Figure 6A:
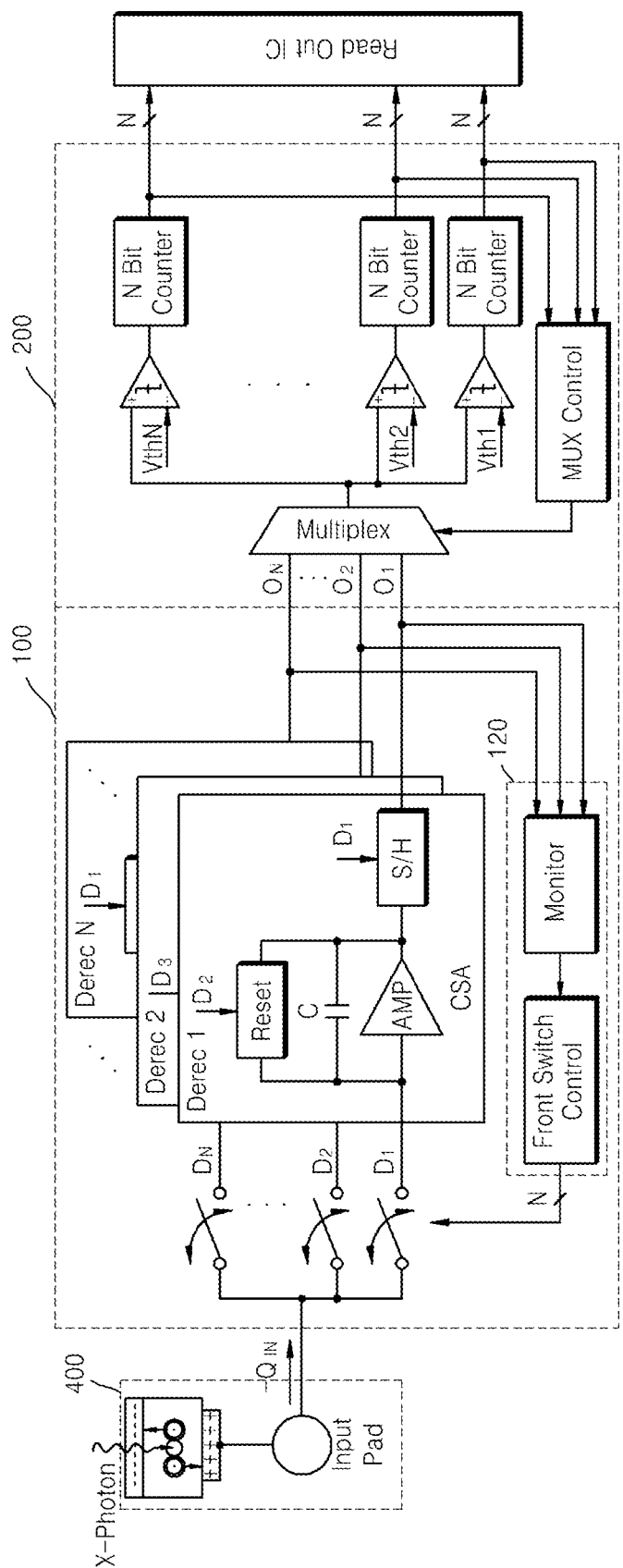
FIGS. 6A-6B are circuit diagrams respectively illustrating examples of a determination unit according to an example embodiment.
Figure 6B:
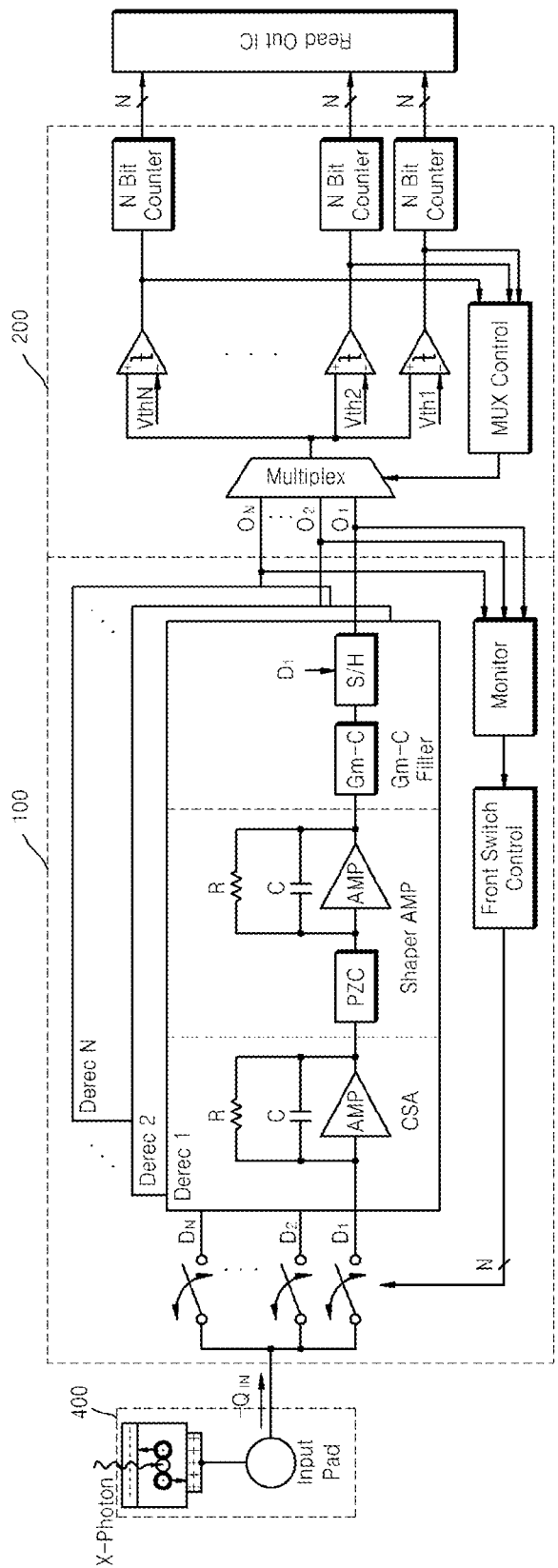

FIGS. 6A-6B are circuit diagrams respectively illustrating examples of the determination unit 200 according to an example embodiment.

Referring to FIGS. 6A and 6B, the photoconducting material unit 400, the voltage obtaining unit 100, and the determination unit 200 are illustrated. In detail, the photoconducting material unit 400 and voltage obtaining unit 100 of FIG. 6A is the same as the circuit of FIG. 5A. Also, the photoconducting material unit 400 and voltage obtaining unit 100 of FIG. 6B is the same as the circuit of FIG. 5B. Thus, detailed descriptions of the photoconducting material unit 400 and the voltage obtaining unit 100 are not repeated.

Referring to FIG. 6A, the determination unit 200 includes a multiplexer, 'm' number of comparators having different threshold values, and a plurality of bit counters respectively connected to the plurality of comparators.

The optimal or maximum values $0_1, 0_2, \ldots, 0_N$ of respective voltages obtained by the conversion units of the voltage obtaining unit 100 are input to the multiplexer of the determination unit 200. First, the determination unit 200 detects a change in a voltage value, based on the maximum value $0_1$ of a voltage obtained through conversion by the first conversion unit 111.

For example, when it is assumed that the comparators included in the determination unit 200 have different levels of threshold values $V_{th\_1}, V_{th\_2}, \ldots, V_{th\_m}$ and the optimal or maximum value $0_1$ of the voltage obtained through conversion by the first conversion unit 111 is greater than the threshold value $V_{th\_m-1}$ or less than the threshold voltage $V_{th\_m}$, the determination unit 200 may sequentially output a turn-on result from a comparator having the threshold value $V_{th\_1}$ to a comparator having the threshold value $V_{th\_m-1}$, and a comparator having the threshold voltage $V_{th\_m}$ may output a turn-off result. In this way, the determination unit 200 may detect a change in a voltage value of the voltage obtained by the voltage obtaining unit 100.

Subsequently, each of the bit counters generates a digital signal in which a turn-on of the comparator is defined as 1, and a turn-off of the comparator is defined as 0. The determination unit 200 may count the number of generations of 1 by using the generated digital signal.

When counting of the voltage obtained through conversion by the first conversion unit 111 is ended, the optimal or maximum value $0_2$ of a voltage obtained through conversion by the second conversion unit 112 is automatically input to the comparators according to control by a MUX controller included in the determination unit 200, and the above-described counting operation is performed.

In this way, when a counting operation based on the voltage $0_N$ obtained through conversion by the nth conversion unit 113 is performed, the maximum value $0_1$ of the voltage obtained through conversion by the first conversion unit 111 is input to the comparators, and the above-described counting operation is performed.

Referring again to FIG. 5, the determination unit 200 transfers data including a counting result to the image generating apparatus 20, which generates an image of an object by using the transferred data.

The reset unit 300 resets a converted voltage by using time information in a period in which the converted voltage increases. In other words, the reset unit 300 discharges a voltage charged into the capacitor of the voltage obtaining unit 100 by using time information corresponding to a change in a voltage value detected by the determination unit 200.

The reset unit 300 may operate the respective MOS switches (Reset) of the conversion units 111 to 113 included in the voltage obtaining unit 100 to discharge the voltage charged into the capacitor. Hereinafter, a detailed operation of the reset unit 300 will be described in detail with reference to FIGS. 7 to 9.

Figure 7:
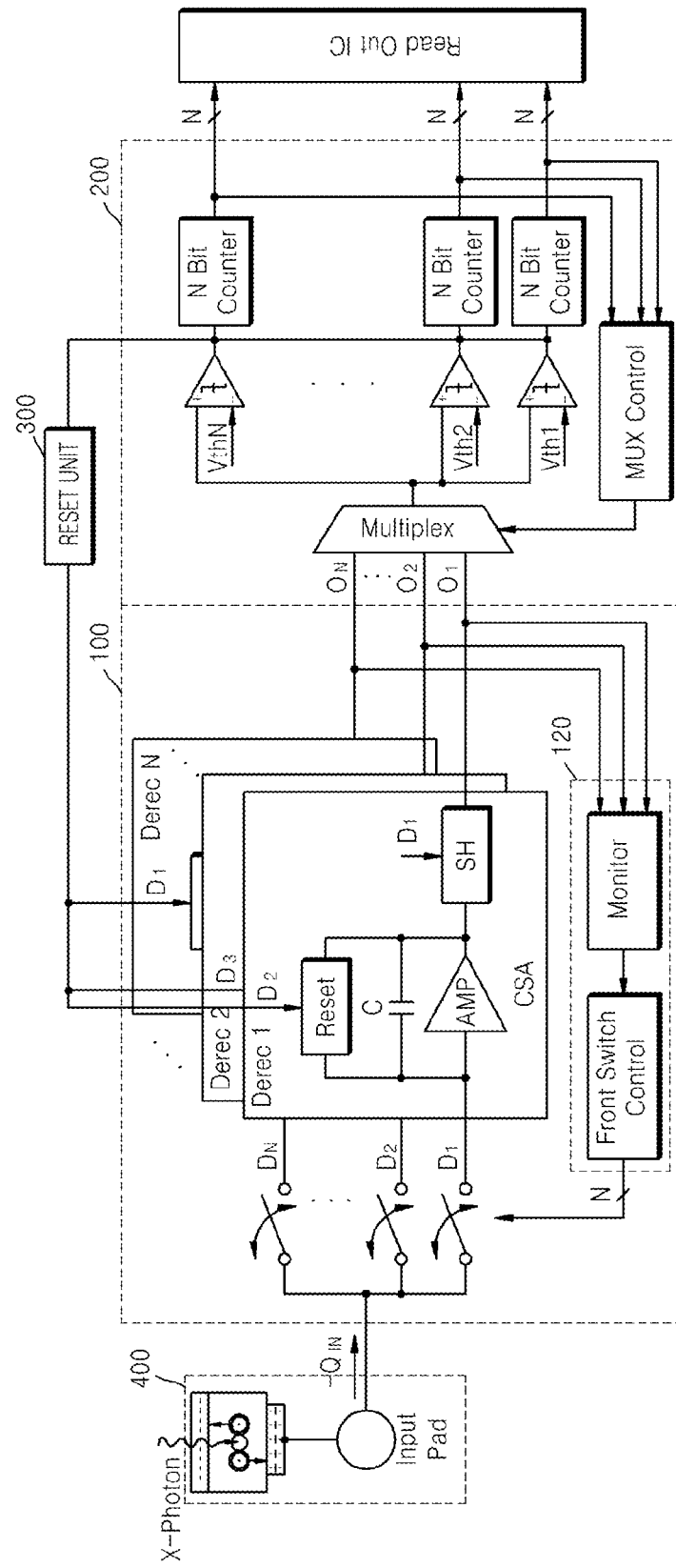
FIG. 7 is a circuit diagram illustrating an example of an reset unit according to an example embodiment.
Figure 8:
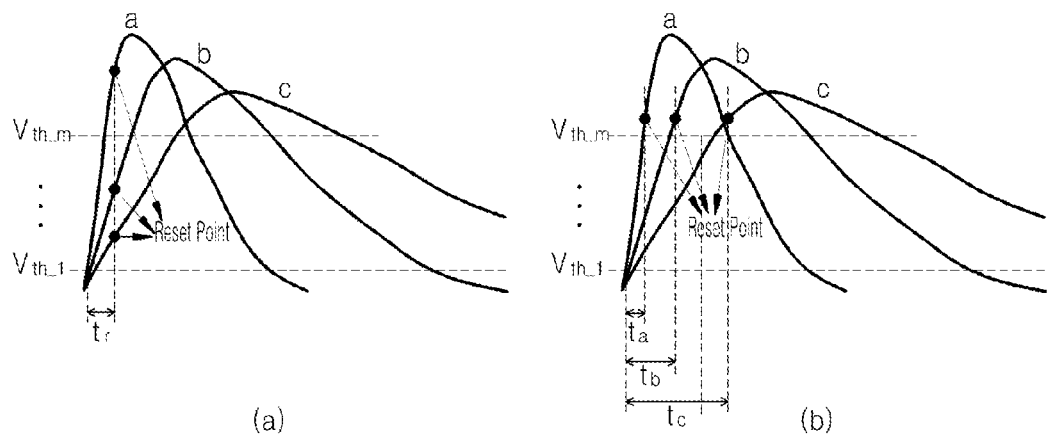
FIGS. 8(a)-8(b) are graphs describing a voltage resetting method according to an example embodiment.
Figure 9:
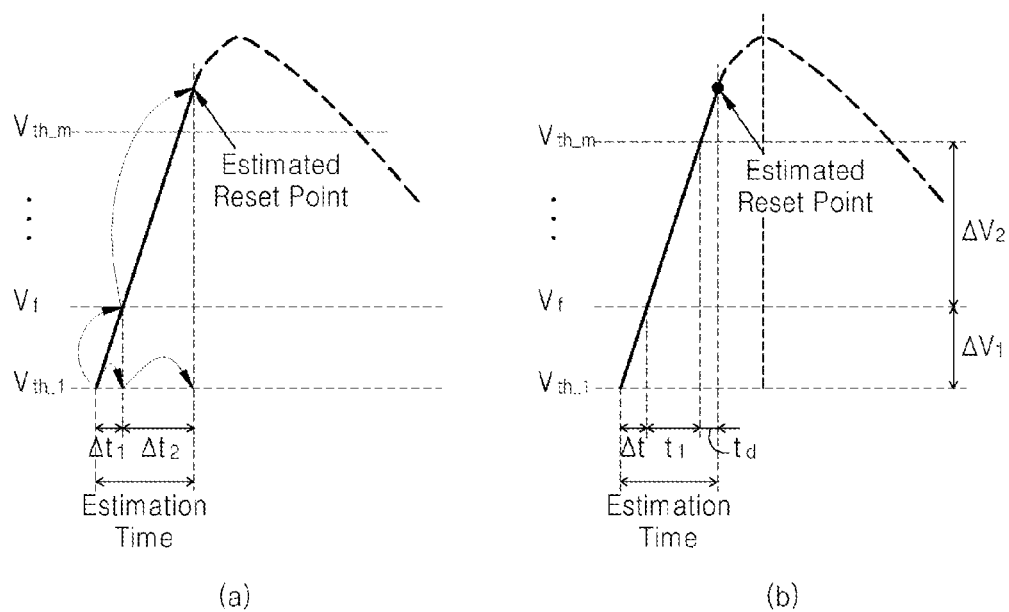
FIGS. 9(a)-9(b) are graphs describing an operation of the reset unit according to an example embodiment.

FIG. 7 is a circuit diagram illustrating an example of the reset unit 300 according to an example embodiment.

Referring to FIG. 7, the reset unit 300 may operate the respective MOS switches (Reset) of the conversion units 111 to 113 by using information transferred from the comparators of the determination unit 200.

Each of the conversion units 111 to 113 according to an example embodiment may connect the MOS switch (Reset) to the capacitor $C_{FB}$, thereby discharging the voltage charged into the capacitor $C_{FB}$ at a high speed. In other words, the reset unit 300 determines a timing when the MOS switch operates, for discharging the voltage charged into the capacitor $C_{FB}$.

FIGS. 8(a)-8(b) are graphs describing a voltage resetting method according to an example embodiment.

The three graphs 'a' to 'c' shown in each of FIGS. 8(a) and 8(b) are graphs showing voltages which are variously obtained according to a characteristic of an object. Also, FIG. 8(a) is a diagram showing voltages which are reset with the same time interval tr, and FIG. 8(b) is a diagram showing an example that adaptively determines a reset timing according to a type of voltage obtained by the reset unit 300, according to an example embodiment.

A voltage graph may be variously shown according to a characteristic of an object. For example, a voltage may be shown as various types of graphs according to a thickness of an object with X-rays irradiated thereon or a density of materials constituting the object.

Referring to FIG. 8(a), when a voltage is reset after a certain time tr elapses from a time (i.e., a time at which a photon is input) at which the voltage increases in graphs 'a' to 'c,' the voltage values to which the graphs 'a' to 'c' are reset differ. That is, unlike graph 'a,' in graphs 'b' and 'c,' a voltage is reset in a state where an increased voltage value is not fully reflected. Therefore, an image of an object generated by the image generating apparatus 20 cannot fully reflect a thickness of the object or a density of materials constituting the object, causing a degradation in quality of an image.

Referring to FIG. 8(b), the reset unit 300 according to an example embodiment adaptively determines a reset timing according to a type of obtained voltage (i.e., a voltage graph). In other words, the reset unit 300 reflects voltage values shown in the graphs 'a' to 'c' and slopes of the graphs 'a' to 'c,' and thus determines different voltage reset timing $t_a$, $t_b$, and $t_c$. Therefore, since information about a characteristic (for example, a thickness or a density) of an object is reflected in an image of the object generated by the image generating apparatus 20, distortion of image information is minimized, and a quality of an image increases.

The reset unit 300 determines a timing for resetting a voltage by using change information of a detected voltage value. In detail, the reset unit 300 determines a timing for resetting a voltage by using time information corresponding to a change in a voltage value detected by the determination unit 200. Hereinafter, a detailed example method of determining a timing when the reset unit 300 resets a voltage will be described with reference to FIG. 9.

FIGS. 9(a)-9(b) are graphs for describing an operation of the reset unit 300 according to an example embodiment.

Referring to FIG. 9(a), a graph 910 showing a voltage obtained by the voltage obtaining unit 100 and 'n' number of different voltage values $V_{th\_1}, \ldots, V_{th\_m}$ divided by the determination unit 200 are shown. The 'n' different voltage values $V_{th\_1}, \ldots, V_{th\_m}$ are the threshold values of the 'm' comparators included in the determination unit 200. Also, in FIG. 9(b), a voltage value $V_f$ is shown separately from the 'm' different voltage values $V_{th\_1}, \ldots, V_{th\_m}$. It is assumed that the graph 910 showing the voltage obtained by the voltage obtaining unit 100 increases up to a voltage value exceeding the highest voltage value $V_{th\_m}$ of the 'm' different voltage values $V_{th\_1}, \ldots, V_{th\_m}$.

According to the graph 910 of FIG. 9(a), the 'm' comparators included in the determination unit 200 may all output a turn-on result. Therefore, a voltage reset timing "$\Delta t_1 + \Delta t_2$" may be determined after a corresponding voltage increases up to the voltage value exceeding the highest threshold value $V_{th\_m}$. The reset unit 300 calculates a previous time $\Delta t_1$ before and a subsequent time $\Delta t_2$ after the voltage obtained by the voltage obtaining unit 100 reaches the voltage value $V_f$, thereby determining the voltage reset timing "$\Delta t_1 + \Delta t_2$." Hereinafter, an operation of the reset unit 300 will be described with reference to FIG. 9B.

Referring to FIG. 9(b), the reset unit 300 calculates a first time $\Delta t_1$ taken until an obtained voltage increases from a first threshold value $V_{th\_1}$ to a certain voltage value $V_f$. Also, the reset unit 300 calculates a second time $t_1$ taken until the obtained voltage increases from the certain voltage value $V_f$ to a second threshold value $V_{th\_m}$. Furthermore, the reset unit 300 adds the calculated first time $\Delta t_1$ and second time $t_1$ to determine a voltage reset timing "$\Delta t_1 + t_1$."

Each of the first threshold value $V_{th\_1}$ and second threshold value $V_{th\_m}$ may denote one of the 'm' different voltage values divided by the determination unit 200. For example, the first threshold value $V_{th\_1}$ may denote the lowest voltage value of the 'm' different voltage values, and the second threshold value $V_{th\_m}$ may denote the highest voltage value of the 'm' different voltage values.

The certain voltage value $V_f$ is a voltage value which is set separately from the 'm' difference voltage values, and may be implemented by adding a comparator having the certain voltage value $V_f$ to the determination unit 200. The certain voltage value $V_f$ denotes a certain value included in a voltage level range in which the 'm' different voltage values are shown.

First, the reset unit 300 calculates the first time $\Delta t_1$ taken until the obtained voltage increases from the first threshold value $V_{th\_1}$ to the certain voltage value $V_f$. For example, the reset unit 300 may perform an XOR operation on a result of the comparator having the first threshold value $V_{th\_1}$ and a result of the comparator having the certain voltage value $V_f$ to calculate the first time $\Delta t_1$. The XOR operation performed by the reset unit 300 is merely an example, and all methods of calculating the first threshold value $V_{th\_1}$ may correspond to an example embodiment with no limitation.

Subsequently, the reset unit 300 calculates the second time $t_1$ taken until the obtained voltage increases from the certain voltage value $V_f$ to the second threshold value $V_{th\_m}$. In detail, the reset unit 300 may combine a first voltage difference $\Delta V_1$ between the first threshold value $V_{th\_1}$ and the certain voltage value $V_f$, a second voltage difference $\Delta V_2$ between the certain voltage value $V_f$ and the second threshold value $V_{th\_m}$, and the first time $\Delta t_1$ to calculate the second time $t_1$.

It is assumed that a period, in which the voltage obtained by the voltage obtaining unit 100 increases, has a linearity with respect to time. In other words, it is assumed that an increase rate of voltage with time is constant. Therefore, the voltage obtaining unit 100 may calculate the first time $\Delta t_1$, and measure the first voltage difference $\Delta V_1$ and the second voltage difference $\Delta V_2$, thereby calculating the second time $t_1$.

For example, the voltage obtaining unit 100 may calculate the second time $t_1$ via the following Equation (2):

$$t_1 = \Delta t \cdot \frac{V_{th\_m} - V_f}{V_f - V_{th\_1}} \quad (2)$$

where $\Delta t_1$ denotes the first time, and $V_{th\_m}-V_f$ denotes the second voltage difference $\Delta V_2$. Also, $V_f-V_{th\_1}$ denotes the first voltage difference $\Delta V_1$.

That is, the reset unit 300 may calculate a ratio of the first voltage difference $\Delta V_1$ and the second voltage difference $\Delta V_2$, and combine the calculated ratio and the first time $\Delta t_1$ to calculate the second time $t_1$.

The reset unit 300 may calculate a certain delay time $t_d$ on the basis of a characteristic of the voltage obtaining unit 100, and may determine a voltage reset timing "$\Delta t_1+t_1+t_d$" by adding the calculated delay time $t_d$. Here, the characteristic of the voltage obtaining unit 100 denotes a characteristic in which a change rate of voltage is changed per hour in an operation of acquiring the voltage.

As described above, it is assumed that the period in which the voltage obtained by the voltage obtaining unit 100 increases has a linearity with respect to time. However, the period may not actually have a linearity with respect to time due to a leakage compensator (not shown) included in the voltage obtaining unit 100. Here, the leakage compensator (not shown) may be connected to the charge sensitive amplifier and the capacitor $C_{FB}$ in parallel. The leakage compensator (not shown) compensates for an error of an increase voltage that is obtained due to a dark current generated in the photoconducting material unit 400 or a leakage current of the readout circuit. Also, the leakage compensator (not shown) allows the voltage obtained by the voltage obtaining unit 100 to be again discharged to a reference voltage.

In detail, when charging an electrical charge into the capacitor $C_{FB}$ included in the voltage obtaining unit 100, the charged electrical charge is partially offset by an operation of the leakage compensator (not shown). Therefore, an amount of electrical charge charged into the capacitor $C_{FB}$ cannot be constant with respect to time, and due to this, the period in which the voltage increases cannot have a linearity.

The reset unit 300 calculates the certain delay time $t_d$ in response to that the period in which the voltage increases cannot have a linearity due to the operation of the leakage compensator (not shown). Furthermore, the voltage obtaining unit 100 may add the calculated delay time $t_d$ and the calculated first time $\Delta t_1$ and second time $t_1$ to determine the voltage reset timing "$\Delta t_1+t_1+t_d$".

As described above, the reset unit 300 may reflect information about a characteristic (for example, a thickness or a density) of an object and information about the characteristic (for example, the operation of the leakage compensator (not shown)) of readout circuit 100 to determine a voltage reset timing, thus minimizing distortion of an image generated by the image generating apparatus 20 and enabling an image having a high dynamic range to be obtained.

Referring again to FIG. 5, the reset unit 130 resets a voltage on the basis of the determined timing. In detail, the reset unit 130 may operate the MOS switch of each of the conversion units 111 to 113 included in the voltage obtaining unit 100 to reset a voltage.

Figure 10:
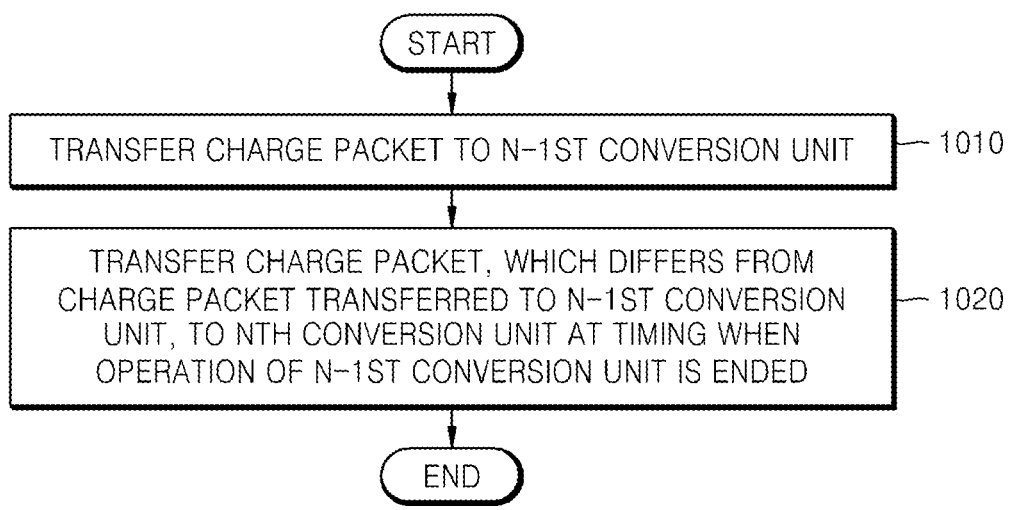
FIG. 10 is a flowchart illustrating an example of a voltage obtaining method according to an example embodiment.

FIG. 10 is a flowchart illustrating an example of a voltage obtaining method according to an example embodiment.

Referring to FIG. 10, the voltage obtaining method includes a plurality of operations that are performed in time series by the voltage obtaining unit 100 illustrated in FIGS. 2 and 4 to 7. Thus, although not described below, the above-described details of the voltage obtaining unit 100 illustrated in FIGS. 2 and 4 to 7 may be applied to the voltage obtaining method of FIG. 10.

In operation 1010, the control unit 120 transfers a charge packet to the (n−1)th conversion unit. Here, each of the conversion units 111 to 113 including the (n−1)th conversion unit converts the transferred charge packet into a voltage. Also, the conversion units 111 to 113 are connected to each other in parallel, and 'n' denotes the number of conversion units.

In operation 1020, the control unit 120 transfers a charge packet, which differs from the charge packet transferred to the (n−1)th conversion unit, to the nth conversion unit at a timing when an operation of the (n−1)th conversion unit is ended. Here, the timing when the operation of the (n−1)th conversion unit is ended denotes a timing when a voltage obtained through conversion by the (n−1)th conversion unit has the maximum value.

As described above, according to one or more of the above example embodiments, charge packets which are sequentially input by the plurality of conversion units connected in parallel are converted into voltages, thereby enhancing a processing speed of the PCD apparatus.

Moreover, a dead time taken in resetting a voltage charged in the capacitor included in each of the plurality of conversion units is shortened as much as possible, and counting the number of photons is performed at a high speed. Also, a voltage reset timing is automatically varied in response to various characteristics of materials included in an object, thus accurately counting the number of photons.

Moreover, X-ray photographing for a broad energy level is performed, and in the CT field and the moving image X-ray field, a lot of images are obtained at a high speed.

The above-described example method may be written as one or more computer programs and may be implemented in general-use digital computers that execute the programs using a computer-readable recording medium. Data structure used in the above-described method may be recorded in a computer-readable recording medium by using various methods. Examples of the computer-readable recording medium include magnetic storage media (e.g., ROM, RAM, USB, floppy disks, hard disks, etc.) and storage media such as optical recording media (e.g., CD-ROMs, or DVDs) and PC interfaces (e.g., PCI, PCI-express, Wi-Fi, etc.).

It should be understood that the example embodiments described therein should be considered in a descriptive sense only and not for purposes of limitation. Descriptions of features within each example embodiment should typically be considered as available for other similar or the same features in other example embodiments.

While one or more example embodiments have been described with reference to the figures, it will be understood by those of ordinary skill in the art that various changes in form and details may be made therein without departing from the spirit and scope defined by the following claims.

What is claimed is:

1. A voltage obtaining apparatus comprising:
a plurality of converters connected to each other in parallel and configured to respectively convert charge packets into voltages; and
a processor configured to control a timing when the charge packets are respectively input to the plurality of converters,
wherein the processor is configured to control the timing so that a corresponding charge packet is input to an nth converter at a timing when an operation of an (n−1)th converter is ended,
wherein n denotes a number of the converters.

2. The voltage obtaining apparatus of claim 1, wherein the timing when the operation of an (n−1)th converter is ended comprises a timing when a voltage obtained through conversion by the (n−1)th converter has a maximum value.

3. The voltage obtaining apparatus of claim 1, wherein the control unit processor is configured to control the timing so that a corresponding charge packet is input to the first converter when an operation of the nth converter is ended.

4. The voltage obtaining apparatus of claim 1, wherein the processor is further configured to reset the converted voltage by using time information in a period in which the converted voltage increases.

5. The voltage obtaining apparatus of claim 4, wherein the processor is further configured to detect a change in a voltage value of the converted voltage by using m different voltage values,
wherein the processor is configured to determine a timing for resetting the voltage by using timing information corresponding to the detected change in the voltage value.

6. The voltage obtaining apparatus of claim 5, wherein, the processor is configured to calculate a first time until the converted voltage increases from a first threshold value to a certain voltage value, and calculates a second time until the converted voltage increases from the certain voltage value to a second threshold value, and
each of the first and second threshold values comprises one of the m different voltage values.

7. The voltage obtaining apparatus of claim 6, wherein the processor is configured to calculate the second time by combining a first voltage difference between the first threshold value and the certain voltage value, a second voltage difference between the certain voltage value and the second threshold value, and the first time.

8. The voltage obtaining apparatus of claim 6, wherein the processor is configured to calculate a ratio of a first voltage difference between the first threshold value and the certain voltage value and a second voltage difference between the certain voltage value and the second threshold value, and is configured to calculate the second time by combining the calculated ratio and the first time.

9. The voltage obtaining apparatus of claim 5, wherein the processor is configured to calculate a certain delay time based on a characteristic of each of the plurality of converters, and is configured to determine the timing for resetting the voltage by further using the calculated certain delay time.

10. The voltage obtaining apparatus of claim 1, wherein at least one of the plurality of converters comprises a metal oxide semiconductor (MOS) switch or a feedback resistor.

11. A voltage obtaining method comprising:
transferring a charge packet to an (n−1)th converter, where n denotes number of converters; and
transferring another charge packet to an nth converter at a timing when an operation of the (n−1)th converter is ended,
wherein a plurality of the converters are connected to each other in parallel, and each converter converts a transferred charge packet into a voltage.

12. The voltage obtaining method of claim 11, wherein the timing when the operation of an (n−1)th converter is ended corresponds to a timing when a voltage obtained through conversion by the (n−1)th converter has a maximum value.

13. The voltage obtaining method of claim 11, further comprising transferring a different charge packet from the charge packet transferred to the nth converter to a first converter when an operation of the nth converter is ended.

14. The voltage obtaining method of claim 11, further comprising resetting the converted voltage by using time information in a period in which the converted voltage increases.

15. The voltage obtaining method of claim 14, further comprising detecting a change in a voltage value of the converted voltage by using m different voltage value,
wherein the resetting comprises determining a timing for resetting the voltage by using timing information corresponding to the detected change in the voltage value.

16. The voltage obtaining method of claim 15, wherein the resetting comprises:
calculating a first time until the converted voltage increases from a first threshold value to a certain voltage value; and
calculating a second time until the acquired voltage increases from the certain voltage value to a second threshold value, and
at least one of the first and second threshold values is one of the m different voltage values.

17. The voltage obtaining method of claim 16, wherein the calculating of the second time comprises calculating the second time by combining a first voltage difference between the first threshold value and the certain voltage value, a second voltage difference between the certain voltage value and the second threshold value, and the first time.

18. The voltage obtaining method of claim 16, wherein the calculating of the second time comprises calculating a ratio of a first voltage difference between the first threshold value and the certain voltage value and a second voltage difference between the certain voltage value and the second threshold value, and calculating the second time by combining the calculated ratio and the first time.

19. The voltage obtaining method of claim 15, further comprising calculating a certain delay time, based on a characteristic of at least one of the plurality of converters,
wherein the resetting comprise determining the timing for resetting the voltage by further using the calculated certain delay time.

20. A non-transitory computer-readable storage medium storing a program for executing the method of claim 11 in a computer.

* * * * *